US010480456B2

(12) United States Patent
Moser et al.

(10) Patent No.: US 10,480,456 B2
(45) Date of Patent: Nov. 19, 2019

(54) GAS INJECTOR INCLUDING LIFT DETHROTTLING

(71) Applicant: Robert Bosch GmbH, Stuttgart (DE)

(72) Inventors: Friedrich Moser, Magstadt (DE);
Guenther Hohl, Stuttgart (DE);
Michael Knorpp, Weissach (DE); Olaf Schoenrock, Stuttgart-Weilimdorf (DE);
Sven Krissler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 15/525,678

(22) PCT Filed: Sep. 29, 2015

(86) PCT No.: PCT/EP2015/072305
§ 371 (c)(1),
(2) Date: May 10, 2017

(87) PCT Pub. No.: WO2016/082985
PCT Pub. Date: Jun. 2, 2016

(65) Prior Publication Data
US 2017/0328309 A1    Nov. 16, 2017

(30) Foreign Application Priority Data
Nov. 28, 2014   (DE) ..................... 10 2014 224 356

(51) Int. Cl.
*F02M 21/02*    (2006.01)
*F16K 31/06*    (2006.01)
(Continued)

(52) U.S. Cl.
CPC .... *F02M 21/0257* (2013.01); *F02M 21/0269* (2013.01); *F02M 21/0275* (2013.01);
(Continued)

(58) Field of Classification Search
CPC .. F02M 21/0257; F02M 61/161; F02M 61/20;
F02M 21/0269; F02M 65/005;
(Continued)

(56) References Cited

U.S. PATENT DOCUMENTS 9,828,957 B2    11/2017   Fujino et al.
2001/0032612 A1*   10/2001   Welch ............... F02M 21/0269
123/294

(Continued)

FOREIGN PATENT DOCUMENTS

CN          1594867 A         3/2005
DE     102013205624 A1      10/2014
(Continued)

OTHER PUBLICATIONS

International Search Report dated Mar. 4, 2016, of the corresponding International Application PCT/EP2015/072305 filed Sep. 29, 2015.

*Primary Examiner* — Xiao En Mo
(74) *Attorney, Agent, or Firm* — Norton Rose Fulbright US LLP; Gerard Messina

(57) ABSTRACT

A gas injector for injecting a gaseous fuel, in particular directly into a combustion chamber of an internal combustion engine, including: a valve closing element for opening or closing a pass-through opening, a valve body, and a sealing seat between the valve body and the valve closing element, in the case of a maximum lift of the valve closing element a flow cross section between the valve body and the valve closing element being smaller in the flow direction upstream from the sealing seat than a flow cross section between the valve closing element and the sealing seat and being smaller than a flow cross section in the flow direction downstream from the sealing seat.

15 Claims, 3 Drawing Sheets

(51) Int. Cl.
*F16K 1/36* (2006.01)
*F16K 1/38* (2006.01)
*F16K 1/42* (2006.01)
*F16K 25/04* (2006.01)
*F02M 55/00* (2006.01)
*F02M 61/16* (2006.01)
*F02M 61/20* (2006.01)
*F02M 63/00* (2006.01)
*F02M 65/00* (2006.01)

(52) U.S. Cl.
CPC ........ *F02M 55/004* (2013.01); *F02M 61/161* (2013.01); *F02M 61/20* (2013.01); *F16K 1/36* (2013.01); *F16K 1/38* (2013.01); *F16K 1/42* (2013.01); *F16K 25/04* (2013.01); *F16K 31/0655* (2013.01); *F02M 21/0209* (2013.01); *F02M 63/0031* (2013.01); *F02M 63/0056* (2013.01); *F02M 65/005* (2013.01); *Y02T 10/32* (2013.01)

(58) Field of Classification Search
CPC .......... F02M 63/0031; F02M 63/0056; F02M 21/0275; F02M 21/0209; F16K 1/42; F16K 1/36; F16K 31/0655; Y02T 10/32
See application file for complete search history.

(56) References Cited

U.S. PATENT DOCUMENTS

| | | | | |
|---|---|---|---|---|
| 2005/0257769 | A1* | 11/2005 | Li | F02B 7/06 123/299 |
| 2006/0219215 | A1* | 10/2006 | Brachert | F02B 23/08 123/299 |
| 2010/0055479 | A1* | 3/2010 | Beardsley | C23C 4/06 428/457 |
| 2011/0023819 | A1* | 2/2011 | Ives | F02B 23/0651 123/298 |
| 2011/0155105 | A1* | 6/2011 | Sukegawa | F02D 41/20 123/478 |
| 2011/0233308 | A1* | 9/2011 | McAlister | F02M 51/0671 239/533.2 |
| 2014/0182559 | A1* | 7/2014 | Steffen | F02D 19/0647 123/478 |
| 2014/0216405 | A1 | 8/2014 | Kato | |
| 2014/0224903 | A1 | 8/2014 | Fujino et al. | |
| 2015/0144093 | A1* | 5/2015 | Harada | F02B 17/005 123/294 |
| 2015/0345454 | A1* | 12/2015 | Yager | F02M 63/02 239/5 |
| 2015/0377185 | A1* | 12/2015 | Schmieder | F02M 21/0269 123/294 |

FOREIGN PATENT DOCUMENTS

| | | |
|---|---|---|
| GB | 2296940 A | 7/1996 |
| JP | H09273451 A | 10/1997 |
| WO | 2008000004 A1 | 1/2008 |
| WO | 2011101541 A1 | 8/2011 |

\* cited by examiner

GAS INJECTOR INCLUDING LIFT DETHROTTLING

FIELD

The present invention relates to a gas injector for injecting a gaseous fuel, in particular directly into a combustion chamber of an internal combustion engine including lift dethrottling, a throttling of the gaseous fuel being decoupled from a maximum lift of a valve closing element. The present invention furthermore relates to an injector system including a gas injector. Another aspect of the present invention relates to an internal combustion engine which includes a gas injector or an injector system of this type.

BACKGROUND INFORMATION

In addition to liquid fuels, gaseous fuels, such as natural gas or hydrogen, have been recently increasingly used in the automotive industry. In conventional directly injecting gas injectors, the problem area involves the high thermal stress on the gas injector, in particular on its valve body. Due to the high thermal stress, it is not possible to use an elastomer as the sealing material, for example, because of its limited temperature resistance. In addition to the good sealing properties of the elastomer, its outstanding damping properties during the closing process are also advantageous. The latter is important in particular in the case of gas injectors due to their lack of a stress-reducing effect of liquid damping. Another problem area in the case of gas injectors which open outwardly involves the fact that a fuel quantity is determined by a cross section which is unblocked by a needle lift. This flow cross section is heavily dependent on manufacturing and setting tolerances during the manufacture and the assembly of the gas injector as well as on changing operating conditions and occurring wear. These factors influence the throttling effect of the gas injector and thus the injected gas quantity in a complex manner.

SUMMARY

A directly injecting gas injector according to the present invention for injecting a gaseous fuel, in particular directly into a combustion chamber of an internal combustion engine, may have the advantage that an injected gas quantity may be kept constant even over a long operating period. According to the present invention, this may be achieved, for example, by placing a cross section, which is designed as a throttling point and determines the through-flow, inside the gas injector. More precisely, the cross section which determines the through-flow is situated upstream from a sealing seat in the through-flow direction of the gas injector when the gas valve is fully open. In this way, the throttling point situated inside the gas injector determines the through-flow of the gaseous fuel and independent of tolerances, temperature effects, wear, etc. Since the throttling point is situated inside the gas injector, the components which determine the cross section determining the through-flow are exposed to high temperatures only to a limited extent so that only minimal temperature-related changes in geometry occur. Moreover, lift overshoots of the valve closing element, which may occur during operation, do not have an influence on the gas quantity to be injected. Furthermore, tolerance chains, which are long and thus difficult to manage, in all the different components of the gas injector under all operating conditions lose their negative influence on the injected gas quantity in the case of a fully open gas injector. Since it is possible to manufacture the valve closing element as well as the valve body in a very precise manner, the flow cross sections may be designed with great accuracy. In contrast to a quantity-determining throttling at the sealing seat, an entire tolerance chain (multiple geometry tolerances, lift setting tolerance, lift change through temperature strain) having an effect on the injected fuel quantity, only the diameter manufacturing tolerances of the valve body and of the valve closing element in particular play a role according to the present invention. By moving the throttling point which determines the through-flow from the sealing seat to an inner chamber of the gas injector, the throttling point is not subjected to mechanical stresses from stops or guides and is thus unaffected by wear. This results in a constant volume flow over the service life. Furthermore, thermal expansions and a lift change resulting from heat strain have no or only little effect on the volume flow. A detailed geometry of the valve body and of the valve closing element upstream and downstream from the throttling point may be designed optimally for the flow of a gas supersonic flow in the narrowest cross section.

Preferred refinements of the present invention are described herein.

In order to provide a throttling point which is preferably cost-effective and manufacturable with the aid of simple manufacturing processes, the valve closing element preferably includes an outside cylinder area defining the flow cross section which determines the through-flow inside the gas injector.

It is furthermore preferred that a valve body includes an inside cylinder area which also defines the flow cross section limiting the through-flow inside the gas injector.

Alternatively, the inside of the gas injector includes several bores or recesses which delimit a through-flow with the aid of a flow cross section. In another alternative, polygonal geometries or a geometry having an elliptical outer contour or any type of possible geometric combinations are provided.

According to another preferred embodiment of the present invention, the flow cross section between the valve body and the valve closing element is asymmetric with regard to a center axis of the gas injector. Due to the asymmetry, the flow of the gaseous fuel may be in particular subjected to a predetermined swirl or the like, thus resulting in advantages during the injection process.

The gas injector according to the present invention is particularly preferably a gas injector which opens outwardly. In this way, according to the present invention it is possible for the first time to combine a gas injector which opens outwardly with a decoupling of the throttling of the gaseous fuel at a maximum lift.

It is furthermore preferred that the gas injector is a directly injecting gas injector which injects the gaseous fuel directly into a combustion chamber of an internal combustion engine.

In order to significantly reduce a temperature in the area of the gas injector on the combustion chamber side, a thermal protection device is preferably provided at the valve body. Thermal stress of other components of the gas injector, in particular of the sealing seat and of the valve closing element, is thus significantly reduced. With the aid of the thermal protection device an undesirable glow ignition is prevented from occurring in excessively hot areas of the gas injector. In this way, it also becomes possible to manufacture the sealing seat from a soft material, e.g., from an elastomer, in particular in gas injectors which open outwardly. Due to the high elastic resilience of such a material and minimal elastic deformation forces it is possible to manufacture a gas injector which is gas-tight over a service life even in the case of geometric imperfections.

According to one preferred embodiment of the present invention, the thermal protection device includes a heat dissipation cap having a first heat conduction coefficient which is greater than a heat conduction coefficient of the valve body. In this way, the heat introduced into the area of the gas injector on the combustion chamber side is efficiently dissipated into a cylinder head, for example. It is particularly preferred that the heat dissipation cap is manufactured from a metal, in particular aluminum. The assembly is made more simply in this way. It may be furthermore preferred that the heat dissipation cap is fastened to the valve body with the aid of a welded or a calked connection. The presence of the heat dissipation cap as well as its shape makes it possible to furthermore customize a flow conduction and a gas mixture.

Alternatively or additionally, the thermal protection device includes a first thermal protective layer having a second heat conduction coefficient which is smaller than the heat conduction coefficient of the valve body and/or smaller than the first heat conduction coefficient of the heat dissipation cap. This serves the purpose of reducing or eliminating the heat transfer from the combustion chamber to the valve body and/or the heat dissipation cap. If heat is still transferred it may be dissipated from the heat dissipation cap. In this way, thermal stress of the valve body is reduced.

It is particularly preferred that the first thermal protective layer is manufactured from ceramic.

The first thermal protective layer is advantageously situated on the heat dissipation cap. In particular, the first thermal protective layer may be situated on a front side facing the combustion chamber. Alternatively or additionally, an inner surface of the pass-through opening may be provided with the first thermal protective layer along the flow conductor.

It is furthermore preferred that the heat dissipation cap includes a plate-shaped area or a plate-shaped base area and a wall area situated on the plate-shaped base area. In this way, the heat dissipation cap may be adapted to different valve body shapes, for example. The heat dissipation path is furthermore adapted depending on the application.

In order to ensure a good thermal connection of the heat dissipation cap to a cylinder head, the heat dissipation cap preferably includes a surface structuring on one contact surface, the contact surface being configured to establish contact between the heat dissipation cap and a cylinder head and being situated on the heat dissipation cap.

It is particularly preferred that the surface structuring includes a knurling. This results in a mating force for installing the gas injector in the cylinder head being reduced.

It is furthermore preferred that the heat dissipation cap includes a heat conduction paste which is applied to a surface of the heat dissipation cap. In particular, the heat conduction paste is inserted in the recesses of the knurling of the heat dissipation cap. In this way, the heat transfer between the heat dissipation cap and the cylinder head is increased.

By reducing a gap and/or a metallic contact between the heat dissipation cap and the cylinder head, a thermal connection between the heat dissipation cap and a cylinder head is advantageously made possible.

It may moreover be advantageous that the valve closing element includes a second thermal protective layer having a third heat conduction coefficient which is smaller than the heat conduction coefficient of the valve body and/or smaller than the first heat conduction coefficient of the heat dissipation cap. This may result in a heat input into the chamber of the gas injector on the combustion chamber side, in particular into the valve closing element, being eliminated or reduced.

It is particularly preferred that the first thermal protective layer and the second thermal protective layer are formed from the same material. In this way, a uniform thermal protective layer is possible on an end of the gas injector on the combustion chamber side. This furthermore results in a cost-effective manufacturing process.

It is moreover advantageous that the sealing seat is situated on the valve body at a predetermined distance from a stop area of the valve body. In this way, the mechanically highly stressed stop area of the valve body is geometrically separated from the sealing seat. This allows for minor wear in the stop area without the gas injector failing due to a leakage. The material of the stop area is preferably tempered and/or coated to be able to tolerate high mechanical stresses.

The present invention furthermore relates to an injector system which includes a gas injector for injecting a gaseous fuel into a combustion chamber and a cylinder head having a cylinder head opening in which the gas injector is situated, an end of the gas injector which faces the combustion chamber being situated in the axial direction of the gas injector at a predetermined distance from an end of the cylinder head opening on the combustion chamber side. In particular, the distance is less than 5 mm. The distance may be up to three times the diameter of the cylinder head opening. By moving the gas injector in a direction which is opposed to the direction of injection, a dead volume is formed in which a flow velocity is low. In this way, the heat transfer of the hot combustion gases to the valve body and the sealing seat is minimized. A combustion preferably also takes place in the dead volume so that no uncombusted fuel components may accumulate which might then result in increased hydrocarbon emissions in the exhaust gas.

It is particularly preferred that the injector system includes a gas injector according to the present invention as described above.

Another aspect of the present invention relates to an internal combustion engine which includes a combustion chamber as well as a directly injecting gas injector according to the present invention or an injector system according to the present invention. The advantages explained with regard to the gas injector according to the present invention and the injector system according to the present invention are connected thereto.

BRIEF DESCRIPTION OF THE DRAWINGS

Exemplary embodiments of the present invention are described in detail below with reference to the figures, identical or functionally identical parts being denoted by the same reference numerals.

DETAILED DESCRIPTION OF EXAMPLE EMBODIMENTS

Figure 1:
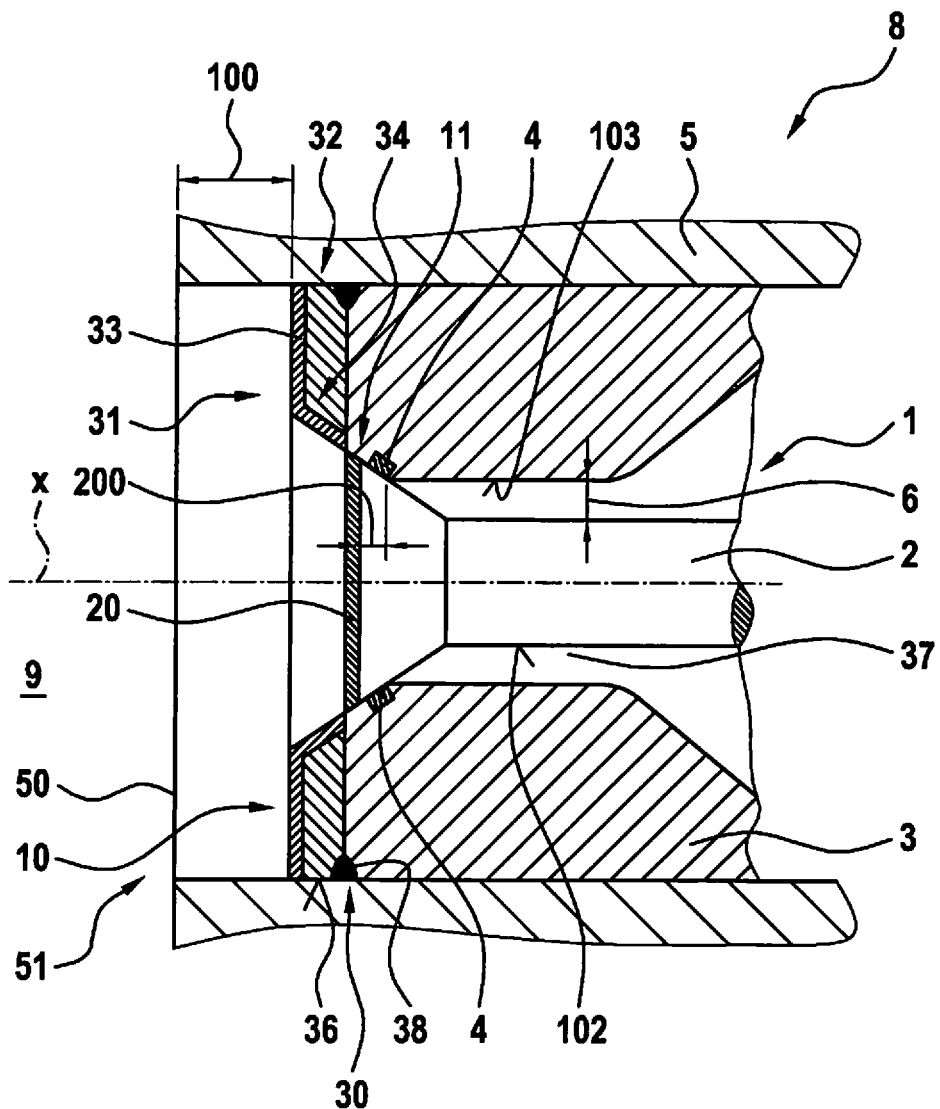
FIG. 1 shows a schematic, highly simplified sectional view of an injector system including a gas injector in a closed state according to a first exemplary embodiment of the present invention.

An injector system 8 according to a first exemplary embodiment of the present invention is described in detail below with reference to FIGS. 1 and 2.

Injector system 8 includes a gas injector 1 for injecting a gaseous fuel into a combustion chamber 9 and a cylinder head 5 having a cylinder head opening 50 of an internal combustion engine (not shown). Gas injector 1 is situated in cylinder head opening 50, an end 10 of gas injector 1 facing combustion chamber 9 being situated at a first predetermined distance 100 from an end 51 of cylinder head opening 50 on the combustion chamber side.

Gas injector 1 furthermore includes a valve closing element 2, a valve body 3 having a pass-through opening 37, which opens or closes valve closing element 2, and a sealing seat 4 which is situated between valve body 3 and valve closing element 2. In FIG. 1, gas injector 1 is in a closed state, pass-through opening 37 being closed by valve closing element 2. FIG. 2 shows gas injector 1 in a fully open state, i.e., at a maximum lift of valve closing element 2.

Valve body 3 furthermore includes a thermal protection device 31 at an end 30 of valve body 3 on the combustion chamber side.

In particular, thermal protection device 31 includes a heat dissipation cap 32 having a first heat conduction coefficient. In addition, thermal protection device 31 includes a first thermal protective layer 33 having a second heat conduction coefficient. Furthermore, heat dissipation cap 32 includes a plate-shaped area 34 which is fastened to valve body 3 with the aid of a welded connection 38.

Moreover, valve closing element 2 is provided with a second thermal protective layer 20 which has a third heat conduction coefficient.

The first heat conduction coefficient of heat dissipation cap 32 is greater than a heat conduction coefficient of valve body 3. Furthermore, the second heat conduction coefficient of first thermal protective layer 33 is smaller than the heat conduction coefficient of valve body 3 and smaller than the first heat conduction coefficient of heat dissipation cap 32. The third heat conduction coefficient of second thermal protective layer 20 of valve closing element 2 is advantageously equal to the second heat conduction coefficient.

As a first measure, a transfer of the heat occurring in the combustion chamber to valve body 3 is thus prevented as a result of the poor heat-conducting properties of first thermal protective layer 33 and second thermal protective layer 20 as compared to valve body 3. If despite these protective measures some of the heat is conducted through first thermal protective layer 33 and second thermal protective layer 20, this heat is dissipated as a second measure via heat dissipation cap 32 to cylinder head 5. It may thus be ensured that valve body 3 and sealing seat 4 are not subjected to thermal stress.

On a contact surface 36, heat dissipation cap 32 includes a surface structuring (not shown), contact surface 36 being configured to establish contact between heat dissipation cap 32 and a cylinder head 5 and being situated on heat dissipation cap 32. The surface structuring is in particular designed as a knurling. The recesses of the knurling, which are not shown, are provided with a heat conduction paste, thus increasing the heat transfer between heat dissipation cap 32 and cylinder head 5.

Furthermore, sealing seat 4 is situated on valve body 3 at a second predetermined distance 200 from a stop area 11 of valve body 3 in axial direction X-X of gas injector 1. This results in a constructive separation between sealing seat 4 and stop area 11 of valve body 3.

Figure 2:
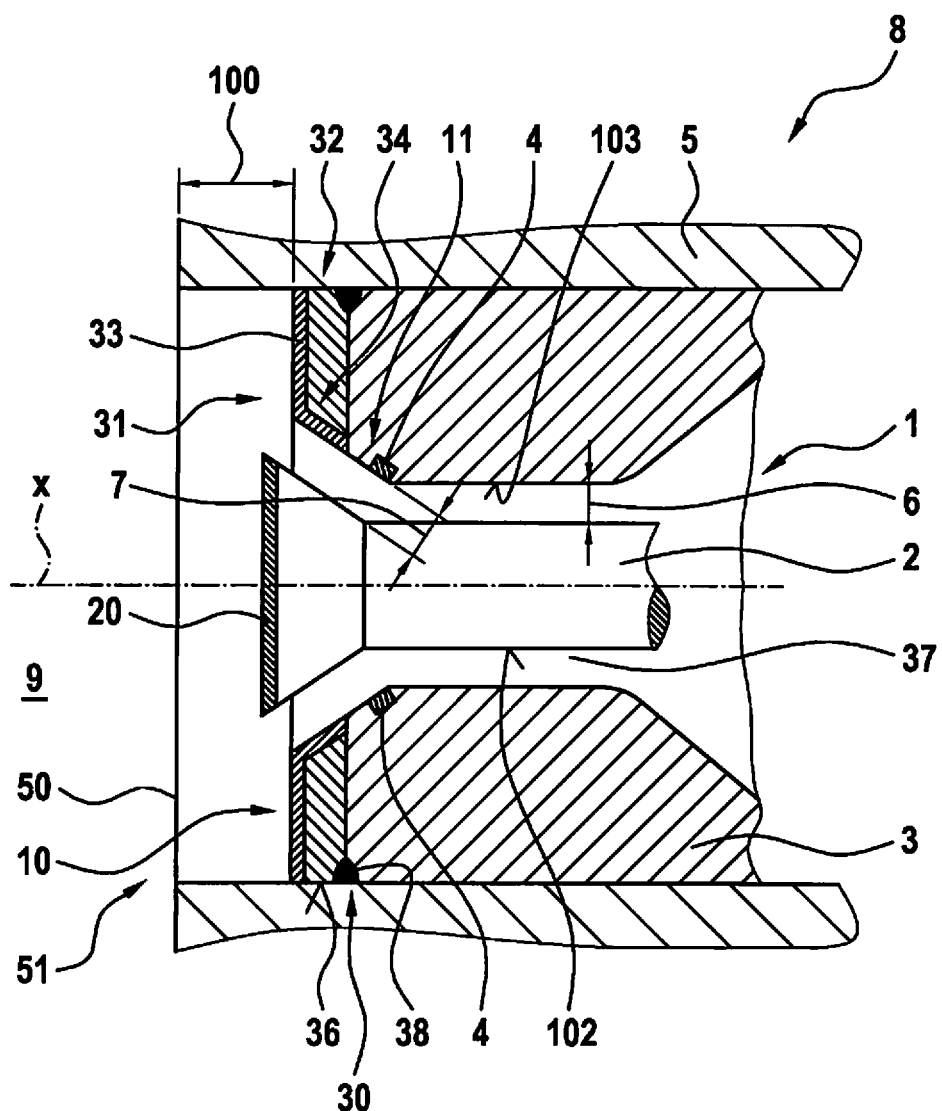
FIG. 2 shows a schematic, highly simplified sectional view of the injector system according to the present invention from FIG. 1, the gas injector according to the present invention being in an open state.

In FIG. 2, gas injector 1 is shown in an open state, pass-through opening 37 being fully opened by valve closing element 2. This state corresponds to a maximum lift of valve closing element 2. According to the present invention, a flow cross section 6 between valve body 3 and valve closing element 2 is in this case smaller than a flow cross section 7 between valve closing element 2 and sealing seat 4. An injected fuel quantity is therefore determined by flow cross section 6 and not by flow cross section 7. As a result of this measure, a cross section which determines the through-flow is moved to the inside of gas injector 1.

As is apparent from FIGS. 1 and 2, flow cross section 6 which is situated inside the gas injector is defined by a cylindrical outer contour of valve closing element 2 and a cylindrical inner contour of valve body 3. The contours of valve closing element 2 and valve body 3 may be generated having minor tolerances with the aid of simple manufacturing processes, in particular metal-cutting manufacturing processes. In this way, the dependence on strong temperature changes, wear and tolerance chains occurring in the related art may be minimized for the injected fuel quantity. Flow cross section 6 inside the gas injector is not subjected to any type of wear, as is the sealing seat in the related art which usually determines the through-flow.

Another advantage is that the flow in flow cross section 6 inside the gas injector may reach the speed of sound and therefore determines the stationary through-flow even in the case of a further increased lift of the valve closing element. Thus, the minimal flow cross section which generates the gas flow, to be injected, at the speed of sound is defined very precisely.

When designing the gas injector, a maximum lift is selected to be big enough for a flow cross section 6 situated inside the gas injector, i.e., in the flow direction through the gas injector, upstream from sealing seat 4 to be smaller than a flow cross section 7 situated downstream from sealing seat 4 in the case of a maximally open gas injector. In addition to the tolerance chain, a potentially occurring oscillation of valve closing element 2 may also be taken into consideration in the design process. Temperature-related length changes due to different materials may also be taken into consideration. Wear does not play a role either for the static through-flow defined by flow cross section 6. The gas injector according to the present invention may thus ensure a high, constant through-flow quantity over its entire service life.

Gas injector 1 according to the present invention provides a plurality of advantages. In particular, thermal protection device 31 of valve body 3 as well as second thermal protective layer 20 of valve closing element 2 make it possible to reduce a temperature, in particular in the area of gas injector 1 on the combustion chamber side. Thermal stress of valve body 3 and of sealing seat 4 may thus be prevented. Repositioning gas injector 1 into cylinder head opening 50 also contributes to reducing thermal stress on valve body 3 and sealing seat 4. This and repositioning sealing seat 4 results in the fact that sealing seat 4 may be formed from a soft material. This is particularly advantageous since a soft material has very good sealing properties and damping properties. In the case of gas injector 1 according to the present invention and the injector system according to the present invention, a consistent separation of functions is furthermore made possible. For example, the sealing, the determination of the static through-flow quantity, the absorption of mechanical stresses, the spray or mixture formation as well as the absorption and dissipation of thermal stresses are provided by different components of gas injector 1. This results in a more cost-effective configuration and a fail-proof operating mode of gas injector 1.

Figure 3:
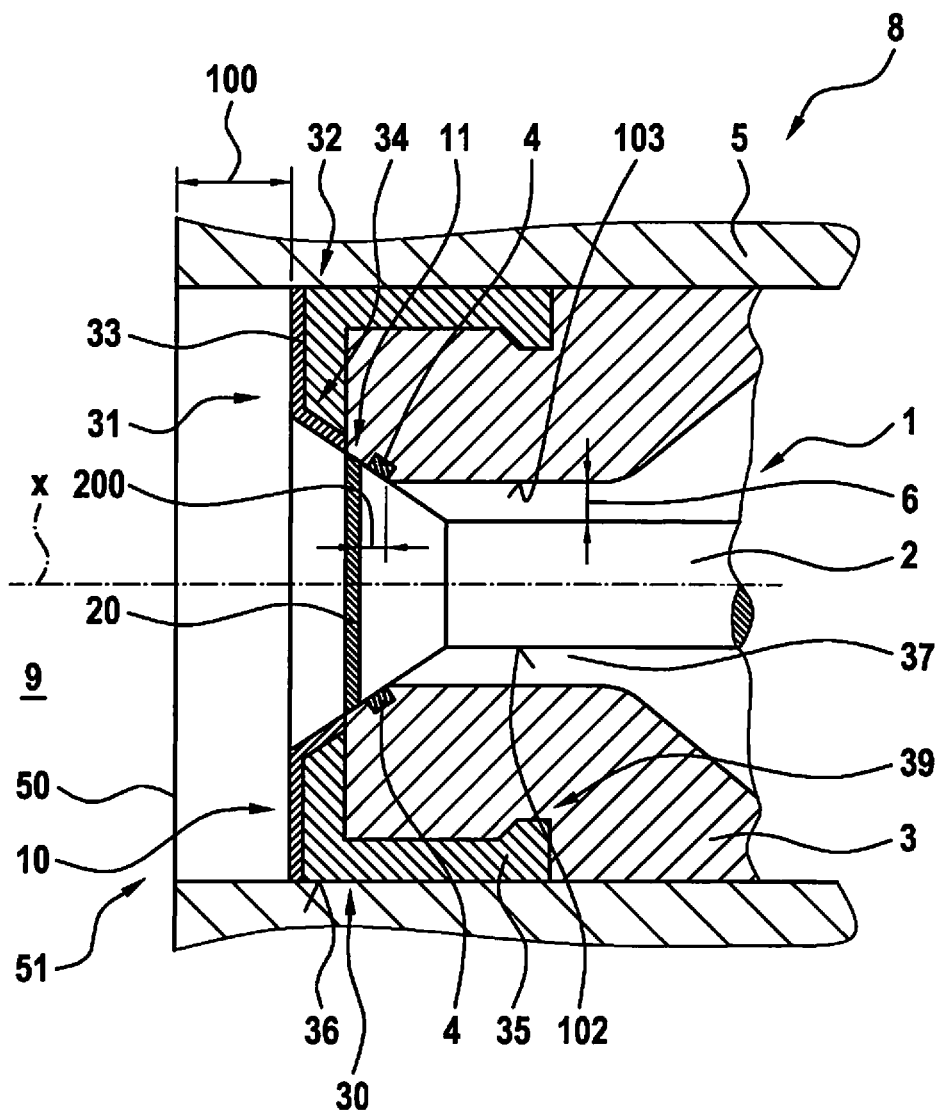
FIG. 3 shows a schematic, highly simplified sectional view of an injector system including a gas injector in a closed state according to a second exemplary embodiment of the present invention.

Gas injector 1 of the second exemplary embodiment in FIG. 3 in general differs from gas injector 1 of the first exemplary embodiment in that heat dissipation cap 32 includes a plate-shaped base area 34 and a wall area 35 situated on plate-shaped base area 34. This allows for contact surface 36 to have a larger design between heat dissipation cap 32 and cylinder head 5, thereby increasing a heat transfer to the cylinder head. Heat dissipation cap 32 is furthermore fastened to valve body 3 with the aid of a calked connection 39. Furthermore, the inner flow cross section between valve closing element 2 and valve body 3 is smaller in the case of a fully open valve than a flow cross section 7 situated in the flow direction downstream from the sealing seat in the case of a fully open gas injector.

It should be noted that the above-named specific embodiments are provided for illustration purposes only and not for limitation purposes of the present invention. Within the scope of the present invention, different changes and modifications are possible without departing from the scope of the present invention or its equivalents.

What is claimed is:

1. A gas injector for injecting a gaseous fuel directly into a combustion chamber of an internal combustion engine, comprising:
   a valve closing element for opening or closing a pass-through opening;
   a valve body; and
   a sealing seat between the valve body and the valve closing element;
   wherein in the case of a maximum lift of the valve closing element, a first flow cross section between the valve body and the valve closing element is smaller in a flow direction upstream from the sealing seat than a second flow cross section between the valve closing element and the sealing seat and is smaller than a third flow cross section in the flow direction downstream from the sealing seat.

2. The gas injector as recited in claim 1, wherein the valve closing element includes an outside cylinder area defining a flow cross section which delimits the through-flow.

3. The gas injector as recited in claim 1, wherein the valve body includes an inside cylinder area defining a flow cross section which delimits the through-flow.

4. The gas injector as recited in claim 1, wherein one of: i) a flow cross section which delimits a through-flow is defined by several bores and recesses in the flow direction upstream from the sealing seat, ii) a flow cross section which delimits a through-flow is defined by a polygonal geometry, or ii) a flow cross section which delimits a through-flow is defined by at least one of an elliptical outer contour and an elliptical inner contour.

5. The gas injector as recited in claim 1, wherein the first flow cross section between the valve body and the valve closing element in the flow direction upstream from the sealing seat is asymmetric to a center axis of the gas injector.

6. The gas injector as recited in claim 1, wherein the gas injector is a gas injector which opens outwardly.

7. The gas injector as recited in claim 1, wherein the flow cross section at the flow cross section in the flow direction upstream from the sealing seat is selected in such a way that at least the speed of sound is reached in this area in the case of an open gas injector.

8. The gas injector as recited in claim 1, wherein the valve body includes a thermal protection device at an end of the valve body on the combustion chamber side.

9. The gas injector as recited in claim 8, wherein the thermal protection device includes a heat dissipation cap having a first heat conduction coefficient which is greater than a heat conduction coefficient of the valve body.

10. The gas injector as recited in claim 9, wherein the thermal protection device includes a first thermal protective layer having a second heat conduction coefficient which is at least one of: i) smaller than the heat conduction coefficient of the valve body, and ii) smaller than the first heat conduction coefficient of the heat dissipation cap.

11. The gas injector as recited in claim 10, wherein the first thermal protective layer is situated on the heat dissipation cap.

12. The gas injector as recited in claim 9, wherein the heat dissipation cap includes a plate-shaped area.

13. An injector system, comprising:
   a gas injector for injecting a gaseous fuel into a combustion chamber; and
   a cylinder head having a cylinder head opening in which the gas injector is situated, an end of the gas injector facing the combustion chamber being situated in the axial direction at a predetermined distance from an end of the cylinder head opening on the combustion chamber side,
   wherein the gas injector injects a gaseous fuel directly into the combustion chamber, the gas injector including a valve closing element for opening or closing a pass-through opening, a valve body, and a sealing seat between the valve body and the valve closing element, wherein in the case of a maximum lift of the valve closing element, a first flow cross section between the valve body and the valve closing element is smaller in a flow direction upstream from the sealing seat than a second flow cross section between the valve closing element and the sealing seat and is smaller than a third flow cross section in the flow direction downstream from the sealing seat.

14. An internal combustion engine, comprising:
   a combustion chamber; and
   a gas injector injects a gaseous fuel directly into the combustion chamber, the gas injector including a valve closing element for opening or closing a pass-through opening, a valve body, and a sealing seat between the valve body and the valve closing element, wherein in the case of a maximum lift of the valve closing element, a first flow cross section between the valve body and the valve closing element is smaller in a flow direction upstream from the sealing seat than a second flow cross section between the valve closing element and the sealing seat and is smaller than a third flow cross section in the flow direction downstream from the sealing seat.

15. The gas injector as recited in claim 9, wherein the heat dissipation cap includes a plate-shaped base area and a wall area situated at the plate-shaped base area.

* * * * *